US012549817B2

(12) United States Patent
Backor et al.

(10) Patent No.: US 12,549,817 B2
(45) Date of Patent: Feb. 10, 2026

(54) FRAME AND CHILD FRAME FOR VIDEO AND WEBPAGE RENDERING

(71) Applicant: Loop Now Technologies, Inc., San Mateo, CA (US)

(72) Inventors: Stefan Backor, Zilina (SK); Wu-Hsi Li, Somerville, MA (US); Michal Svrček, Zilina (SK)

(73) Assignee: Loop Now Technologies, Inc., San Mateo, CA (US)

( * ) Notice: Subject to any disclaimer, the term of this patent is extended or adjusted under 35 U.S.C. 154(b) by 0 days.

(21) Appl. No.: 17/830,393

(22) Filed: Jun. 2, 2022

(65) Prior Publication Data

US 2022/0394345 A1 Dec. 8, 2022

Related U.S. Application Data

(60) Provisional application No. 63/344,064, filed on May 20, 2022, provisional application No. 63/332,703, (Continued)

(51) Int. Cl.
*H04N 21/472* (2011.01)
*G06F 3/0481* (2022.01)
(Continued)

(52) U.S. Cl.
CPC ..... *H04N 21/47202* (2013.01); *G06F 3/0481* (2013.01); *H04L 67/02* (2013.01); *H04N 21/8586* (2013.01)

(58) Field of Classification Search
CPC ........... H04N 21/4622; H04N 21/4316; H04N 21/4782; H04N 21/47; H04N 21/478; (Continued)

(56) References Cited

U.S. PATENT DOCUMENTS 6,483,986 B1 * 11/2002 Krapf ................. H04N 21/4333
386/E5.001
8,069,414 B2   11/2011 Hartwig et al.
(Continued)

FOREIGN PATENT DOCUMENTS

KR   10-2011-0023404 A    3/2011
KR   10-2011-0129715 A   12/2011
KR       101606860 B1    3/2016

OTHER PUBLICATIONS

International Search Report dated Sep. 21, 2022 for PCT/US2022/031868.

*Primary Examiner* — Jason Salce
(74) *Attorney, Agent, or Firm* — Adams Intellex, PLC

(57) ABSTRACT

Techniques for display using frame and child frame technology for video and webpage rendering are disclosed. A video stream is received. The video stream is displayed as a video in a window on a device display along with a link. The link includes a webpage uniform resource locator (URL). A selection of the link made by a user is received. The selection is made in response to a call to action. The video is rendered along with results of the link that was selected. Rendering of the results of the link includes a webpage associated with the webpage URL. The user can interact with the webpage while the video is being rendered. The video is reduced to render the video as a reduced video on a portion of the device display. The rendering the reduced video and webpage is accomplished without a popup window.

25 Claims, 7 Drawing Sheets

Related U.S. Application Data filed on Apr. 20, 2022, provisional application No. 63/302,593, filed on Jan. 25, 2022, provisional application No. 63/226,081, filed on Jul. 27, 2021, provisional application No. 63/196,252, filed on Jun. 3, 2021.

(51) Int. Cl.
  *H04L 67/02* (2022.01)
  *H04N 21/858* (2011.01)

(58) Field of Classification Search
  CPC ............. H04N 21/4438; H04N 21/482; H04N 7/17318; H04N 21/8586
  See application file for complete search history.

(56) References Cited

U.S. PATENT DOCUMENTS

| | | | |
|---|---|---|---|
| 8,244,707 B2 | 8/2012 | Lin et al. | |
| 8,572,490 B2 | 10/2013 | Hartwig et al. | |
| 9,118,712 B2 | 8/2015 | McCoy et al. | |
| 9,152,392 B2 | 10/2015 | Petro et al. | |
| 9,532,116 B2 | 12/2016 | Terpe | |
| 9,608,983 B2 | 3/2017 | Fee | |
| 9,645,700 B2 | 5/2017 | Tsai | |
| 9,693,013 B2 | 6/2017 | Nesamoney et al. | |
| 9,824,372 B1 | 11/2017 | Seth et al. | |
| 10,089,402 B1 | 10/2018 | Winkler et al. | |
| 10,496,350 B2 | 12/2019 | Lazier et al. | |
| 10,955,999 B2 | 3/2021 | Lotinsky et al. | |
| 11,317,060 B1 | 4/2022 | Libin | |
| 2001/0001160 A1* | 5/2001 | Shoff | H04N 21/4312 725/108 |
| 2001/0027475 A1* | 10/2001 | Givol | H04N 21/25883 348/E7.071 |
| 2002/0069411 A1* | 6/2002 | Rainville | H04N 5/44504 725/110 |
| 2003/0208751 A1* | 11/2003 | Kim | H04N 7/16 348/E7.054 |
| 2006/0130109 A1 | 6/2006 | Zenith | |
| 2007/0043713 A1 | 2/2007 | Elmi et al. | |
| 2007/0089158 A1* | 4/2007 | Clark | H04N 21/4622 348/E7.071 |
| 2010/0149359 A1 | 6/2010 | Taoka | |
| 2013/0021373 A1 | 1/2013 | Vaught et al. | |
| 2013/0097477 A1 | 4/2013 | Adolf et al. | |
| 2013/0145267 A1 | 6/2013 | Ramachandran | |
| 2013/0215116 A1 | 8/2013 | Siddique et al. | |
| 2013/0276021 A1 | 10/2013 | Cho | |
| 2014/0101537 A1 | 4/2014 | Antkowiak et al. | |
| 2014/0106881 A1 | 4/2014 | Antkowiak et al. | |
| 2014/0229331 A1 | 8/2014 | McIntosh et al. | |
| 2014/0376876 A1 | 12/2014 | Bentley et al. | |
| 2015/0177940 A1 | 6/2015 | Trevino et al. | |
| 2015/0195175 A1 | 7/2015 | Kariman | |
| 2015/0213516 A1 | 7/2015 | Jeremias | |
| 2015/0278348 A1 | 10/2015 | Paruchuri et al. | |
| 2016/0065929 A1 | 3/2016 | Barcons-Palau et al. | |
| 2016/0078059 A1 | 3/2016 | Kang et al. | |
| 2016/0088369 A1 | 3/2016 | Terpe | |
| 2016/0093105 A1 | 3/2016 | Rimon et al. | |
| 2017/0109584 A1 | 4/2017 | Yao et al. | |
| 2017/0269816 A1 | 9/2017 | Bradley et al. | |
| 2017/0372678 A1* | 12/2017 | Ying | G06F 3/04883 |
| 2018/0068019 A1 | 3/2018 | Novikoff et al. | |
| 2018/0132011 A1 | 5/2018 | Shichman et al. | |
| 2018/0152767 A1 | 5/2018 | Liu et al. | |
| 2018/0253765 A1 | 9/2018 | Avedissian et al. | |
| 2018/0288396 A1 | 10/2018 | Bouazizi et al. | |
| 2021/0014559 A1 | 1/2021 | Thapaliya | |
| 2022/0053233 A1 | 2/2022 | Baxter et al. | |
| 2022/0122161 A1 | 4/2022 | Perera | |
| 2022/0191594 A1 | 6/2022 | Devoy, III et al. | |
| 2022/0345755 A1 | 10/2022 | Pollock et al. | |
| 2022/0353473 A1 | 11/2022 | Springer | |
| 2023/0126108 A1 | 4/2023 | Roper | |

\* cited by examiner

FRAME AND CHILD FRAME FOR VIDEO AND WEBPAGE RENDERING

RELATED APPLICATIONS

This application claims the benefit of U.S. provisional patent applications "Frame And Child Frame For Video And Webpage Rendering" Ser. No. 63/196,252, filed Jun. 3, 2021, "Video Stream Interface Based On Third-Party Webpage Information" Ser. No. 63/226,081, filed Jul. 27, 2021, "Ecommerce Purchase Within A Short-Form Video Environment" Ser. No. 63/302,593, filed Jan. 25, 2022, "Tokenizing A Manipulated Short-Form Video" Ser. No. 63/332,703, filed Apr. 20, 2022, and "Short-Form Videos Usage Within A Frame Widget Retail Environment" Ser. No. 63/344,064, filed May 20, 2022.

Each of the foregoing applications is hereby incorporated by reference in its entirety.

FIELD OF ART

This application relates generally to display and more particularly to frame and child frame for video and webpage rendering.

BACKGROUND

Video streaming has grown in popularity as a source of entertainment, information, and commerce. For years, video viewers had been constrained to television sets and movie theatres, but streaming has created ever-expanding opportunities to create, promote, and consume content, especially using mobile devices. More than ever before, viewers can control what they watch, and when and where they want to watch it. Streaming companies can provide video content 24/7 for their subscribers. Viewers are no longer constrained to TV program schedules and theatre showing times. Often for monthly costs that are less than what it costs to take a family trip to a movie theatre, subscribers can watch an unlimited number of movies, TV shows, documentaries, and more. Content created decades ago can be as readily available as content created within the past year. Streaming services can even create their own exclusive content for their subscribers, thus encouraging consumers to purchase their service to view that specific content. Video streaming providers can recommend new content based on past viewing choices, thus tailoring suggestions for each user, which can increase customer satisfaction.

Gaming sites can stream video of professional gamers playing video games, offering commentary and showcasing their skills. While watching the gamers, viewers can interact with other viewers via live posting of messages, thus creating an online community of people with similar interests. Gamers can generate so many followers that the gamers even attract sponsorships. Some companies provide streaming content for free, using an ad-supported business model to monetize it. Through these sites, adults, teens, and children can post content they've created and share it with an audience, whether a private audience who needs a password for access, or a public audience where the content is available to anyone. Parents can share their children's piano recitals with relatives who couldn't attend. Friends can share holiday wishes from anywhere around the world. Sports teams can share their players' athletic highlights with fans. Entrepreneurs can share their products and services with customers. Influencers can use video streaming to create and to promote their brands, pivoting off the personalized engagement it offers. Viewers can interact directly with influencers, which creates relationships and deepens the connection. In this way, viewers can identify with influencers. Viewers can also share live videos using social media, which can expand an influencer's brand quickly.

When much of the world shut down during the pandemic, individuals were able to use livestream video services from companies to stay in touch with loved ones. These services have also enabled employees to continue working from home, and they have enabled companies to stay connected with their customers when traditional in-person meetings are not an option. Livestream video can enable viewers to experience an event in real time, even when on the go. When waiting in line at the store, fans can watch their favorite teams compete. Voters can watch a live presidential debate while out for an evening walk. From real-time news coverage to award shows to product launches, entertainment, information, and commerce can be instantly available at a viewer's fingertips.

SUMMARY

Electronic devices, which can include desktop computers, laptop computers, tablets, smartphones, and PDAs, are widely used by people who want to observe and interact with content such a video stream. The video streams can include livestreams, in which an individual or team of individuals can present thoughts and comments, hawk goods and services, and so on. The video streams can be used to promote an individual, a good, or a service, etc.; to present information such as news, sports, government announcements, and entertainment, educational material; and so on. A video stream can be viewed in a window associated with a video app or player, using a plugin associated with a web browser window, etc. An originator of a video stream, such as an individual, can include in their stream a link or uniform resource locator (URL). The further information can include a website associated with the individual, details about a good or service that is the subject of the video stream, etc. The further information can be accessed by selecting the link in the video stream. The results of the link can include web content, where the web content can include text, photographs or images, audio, video, etc. The results of the link can be rendered along with the video. In order for the link results and the video to fit within the size of the app or browser window, the video can be reduced, and the reduced video can be rendered "on top" of the link results. The rendering can be accomplished using a frame for the video and a child frame for the results of the link.

Display is based on frame and child frame for video and webpage rendering. The video stream can be provided by an individual, a team, a stream provider, and so on. The video stream can include a livestream video. The video stream is displayed as a video in a window on a device display along with a link. The video stream can be displayed within a frame associated with the window. The displaying the video can be accomplished using an app, a window associated with a web browser, and the like. The link can access content such as text, images, audio, video, etc. The link can include a webpage URL. A selection of the link by a user can be received. The link can be selected by clicking on the link displayed along with the video, by clicking the image to access a hidden link, by selecting a link within chat, and so on. The video is rendered along with results of the link that was selected. The results of the link can be displayed within a child frame associated with the window. The video is reduced to render the video as a reduced video on a portion of the device display. The reduced video can be rendered over the results of the link that was selected. The rendering the reduced video and webpage is accomplished without a popup window.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Techniques for display based on frame and child frame for video and webpage rendering are disclosed. A video such as a video stream video can be received by an individual. The received video stream can be received using an electronic device such as a desktop computer, a laptop computer, a tablet, a smartphone, a personal digital assistant (PDA), and so on. The video stream video can be viewed using an app such as a video player, a web browser with a plugin, and so on, loaded on an electronic device. The video stream enables the individual to reach out to subscribers, followers, likeminded individuals, the curious, and others. The video stream can present a message such as an opinion, a message, a product promotion or criticism, etc. The provider can present a link such as a web link that can be displayed along with the video stream video. The link can be used to access text, images, video, audio, and other contents that present a message, convey a feeling or cause a visceral reaction, develop a theme or an experience, and so on, related to or associated with the topic of the video stream video. The video stream can also include a chat feature in which viewers can share comments, endorsement, rants, web links, and much more. The viewer can click a link to receive the results of the link. The video stream video and the results of the link can be rendered within the app or browser window using a frame for the video and a child frame for the results of the link. The video can be reduced in size and can be rendered over the results of the link.

Figure 1A:
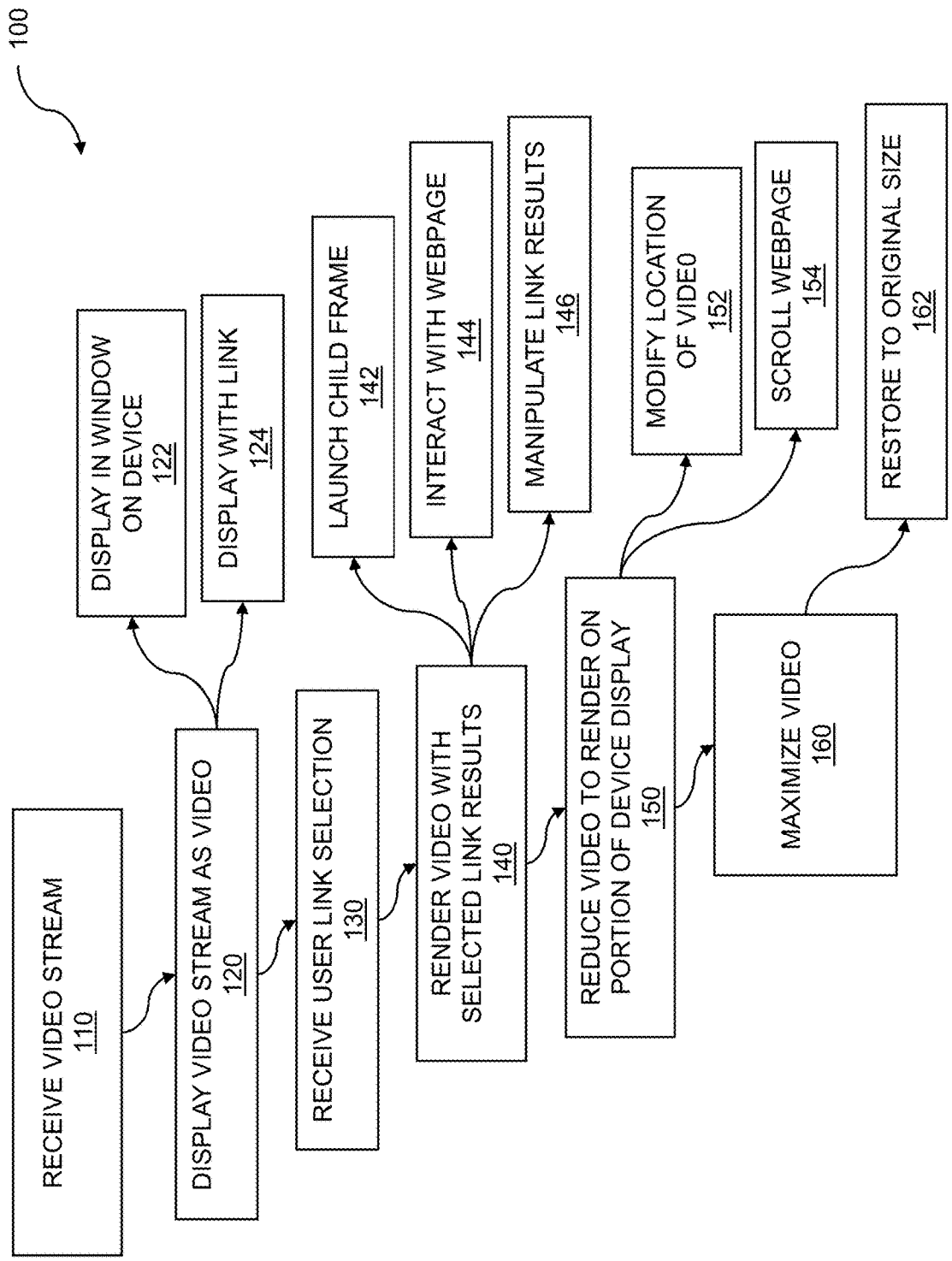
FIG. 1A is a flow diagram for frame and child frame rendering.

Display is enabled using a frame and child frame for video and webpage rendering. A video stream is received. A video stream can include a livestream, where the livestream can be provided by an individual who desires to speak about a product, share an opinion, comment on a news story, and so on. The video stream is displayed as a video in a window on a device display along with a link. The window can be associated with an app or web browser. The link can include a web link to content such as text, photographs, audio, video, etc. A selection of the link by a user is received. The link that is selected can include the link presented with the video stream, a link embedded within the video, a link in the chat stream, and so on. The video is rendered along with results of the link that was selected. The video can be rendered in a frame associated with the window, and the results of the link can be rendered within a child frame, further associated with the window. The video is reduced to render the video as a reduced video on a portion of the device display. The reduced video can be rendered on top of the results of the link. The reduced video can be rendered initially at a position within the window and can be moved to another position based on an action taken by the user. In embodiments, the rendering the reduced video and webpage is accomplished without a popup window FIG. 1A is a flow diagram for a frame and a child frame for video and webpage rendering. Videos, which can include video stream videos, short-form videos, and so on, can include various media and content types. While some videos can include news videos, entertainment videos, political message videos, and so on, video stream videos can include live or recorded videos provided by individuals, teams of collaborators, and the like. The video stream videos can be provided by social media influencers, tastemakers, celebrities, and others. Anyone with access to minimal equipment such as a camera, microphone, and electronic device, and has something to say, can provide a video stream to inform, entertain, or inspire others, or just themselves. The videos can be viewed on an electronic device used by an individual. The viewing can be accomplished by rendering the video within a frame associated with a window. The window can include a window provided by an app, a window associated with a web browser, etc. The video can include links to a variety of content such as text, images, audio, video, and websites. The content that results from selecting the link can be rendered in a child frame associated with the viewing window. The user can continue to view the video and can interact with the contents rendered in the child frame. The video can be paused and restarted, while the contents in the child frame can be scrolled, clicked, etc. The contents within the child frame can be scrollable in the horizontal orientation, in the vertical orientation, etc. Results from the link can be auto-played, started and stopped, paused, and the like.

The flow 100 includes receiving 110 a video stream. A video stream can include multimedia content such as audio and video, a soundtrack, a slideshow, and so on. In embodiments, the video stream can include a livestream. The video stream can be provided by an individual or team, a media enterprise, a political organization, an educational institution, and so on. The video stream can include entertainment content, socially shared content, etc. The video stream can be based on a variety of encoding and decoding or "codec" techniques including H.264, H.265/HVEC, and the like. The flow 100 includes displaying the video stream 120 as a video. The displaying the video stream can be accomplished using a general-purpose video app such as QuickTime™, VLC Media Player™, GOM Player™, and so on. The displaying the video can be accomplished using a purpose-built media player, a browser plug-in, etc. In the flow 100, the video stream is displayed in a window 122 on a device. The window in which the video can be displayed can include a window associated with an app, a window associated with a web browser or browser tab, etc. The window can include a frame in which the video can be displayed. A frame can include a portion of the window, in which video stream video can be displayed, that is independent of a container of the frame. The container of the frame can include other content that may be displayed along with the video stream video, the browser window, etc. Contents of the frame such as the video stream can be loaded independently of the container of the frame. In the flow 100, the video stream is displayed along with a link 124. The link can include a link to content, where the content can include media such as text, images, audio files, video files, and the like. In embodiments, the link can include a webpage associated with the webpage URL. The link can include a visible link, an embedded link, etc. The link can appear in a chat stream associated with the video stream (discussed below). The link is rendered "on top" of the video from a user's perspective, but clicking the link enables the navigation it implies to be intercepted by another server, as described later.

The webpage is launched within an expanded container window which can display both the webpage and the video that was reduced. The flow 100 includes receiving a selection of the link 130 by a user. The selection of a link can be accomplished by clicking a link displayed with a video stream video, clicking the video to select an embedded link, clicking a menu selection, clicking a link in the chat, etc. The selecting can include using a mouse or a trackpad, swiping a cursor over the video, and so on. The selecting a link can cause results of the link to be provided. The results can include media such as text, an image, audio, video, etc. In embodiments, the link can include a webpage URL. The webpage can be associated with the provider of the video stream, can reference a good or service, can provide further information, and the like. In embodiments, the selection by the user can be in response to a call to action. The call to action can include a purchase link, a survey link, a support link, etc. The flow 100 includes rendering the video 140 along with results of the link that was selected. The rendering results of the link can include displaying the file or image, playing the audio or video, displaying a new webpage, etc. In embodiments, rendering of the results of the link can include a webpage associated with the webpage URL. The flow 100 further includes launching a child frame 142 into which the webpage is displayed. The child frame can also be used to display text, images, and videos; to play audio; and the like. In embodiments, the child frame can surround the video being rendered. The child frame can be displayed on top of the webpage, speaking phenomenologically, such that it is layered over, or on top of, the video, but then allows the reduced video to be displayed. The child frame can be a reloaded version of the webpage that subsumes the webpage and the video, with the video being reduced and, for example, placed in a corner of the display, such that the webpage is visible in the child frame along with the reduced video. The video can be reduced (discussed below) for display with the results of the link. The flow 100 further includes interacting with the webpage 144, by the user, while the video is being rendered. The interacting can also include interacting with a text, images, audio, videos, etc. The interacting can include clicking links, selecting menu options, etc. The flow 100 further includes manipulating 146, by the user, the results of the link. The webpage or other content that is rendered with the video is not merely static, but can be manipulated, operated on, etc., by the user. In embodiments, the manipulating can include scrolling the results. A webpage, for example, can be scrolled up, scrolled down, swiped left or right, and so on. In other embodiments, the manipulating can include starting and pausing rendering of the results. Starting, pausing, stopping, scrubbing (e.g. fast forward or fast reverse) techniques can be used to control playback or audio files, video files, and the like.

The flow 100 includes reducing the video 150 to render the video as a reduced video on a portion of the device display. The reducing the video can include reducing the dimensions of the video based on a percentage, an aspect ratio, a user selection, and the like. In embodiments, the reducing the video can be in response to a reduction selection by the user. The reducing can be performed to improve visibility of the results of the link, which can be rendered in the child frame that surrounds the frame in which the reduced video is rendered. In embodiments, the reduced video can be rendered over the results of the link that was selected. Recall that the results of the link can include a webpage. In embodiments, the rendering the reduced video and webpage is accomplished without a popup window. Rendering without a popup window enables rendering of the reduced video and the webpage and prevents the disruption of a popup blocker associated with the web browser. In other embodiments, the webpage can be launched within an expanded container window containing a display of both the webpage and the video that was reduced. The expanded container can include the frame in which the video is rendered and the child frame in which the webpage is rendered. In other embodiments, the reducing can cause the video to render in a lower right corner of the window. The video can be rendered at other positions relative to the results of the link. The flow 100 further includes modifying the location 152 for the reduced video being displayed. The modifying the location of the window can include relocating the window to a corner of the browser window; top, left, right, or bottom center of the window; center of the window; and so on. The modifying location of the reduced video can be based on a user configured location, a menu selection, or other action that can be performed by a user. In embodiments, the modifying location can occur in response to a mouse dragging motion made by the user, a trackpad drag and drop operation, a finger slide on a touch sensitive display, etc. The flow 100 further includes scrolling the webpage 154 while location of the video remains fixed. The fixed video can continue playing, can be paused and restarted, and the like. In embodiments, the video can be paused and restarted based on selection by the user. The video can also be paused and restarted by the provider of the video.

In embodiments, the rendering the reduced video can accomplish a picture-within-picture function. The reduced video can be rendered as one picture, while a webpage, video, etc., can be rendered as a second picture. In embodiments, the webpage can be an outer picture for the picture-within-picture function. The outer picture, which can be thought of as an expanded container, can be used to enable viewing of a larger portion of the webpage compared to the portion of the webpage that could be viewed within the smaller picture. In other embodiments, the rendering the video can include an inner picture for the picture-within-picture function. The video can continue to play within the inner picture. Noted throughout, in further embodiments, the webpage can include another video being displayed along with the reduced video. The video included in the webpage can be played, paused, restarted, etc. In embodiments, the rendering the reduced video can accomplish a page-within-page function. A page-within-page function can include displaying a webpage within a webpage. Recall that the video stream video, the results of the link, etc., can be displayed within a window associated with a web browser. In embodiments, the rendering can be accomplished using an inline frame function within an internet browser application. The contents of the frame can be updated, changed, reloaded, etc., without affecting the internet browser application.

The flow 100 further includes maximizing 160 the video, after the reducing. The maximizing the video can be based on a window size associated with the rendering of the video, a user size preference, a preset size based on resolution of the video, and the like. The maximizing can include filling an app window or a browser window with the video stream video, up-scaling or down-scaling the video to fit the window, and so on. The maximizing the video can be accomplished by selecting an appropriately sized video for rendering. The flow 100 includes restoring rendering of the video 162 to an original size of the video. The restoring rendering of the video can include closing the child frame. The restoring the video can include expanding the frame to fill the window.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 1B:
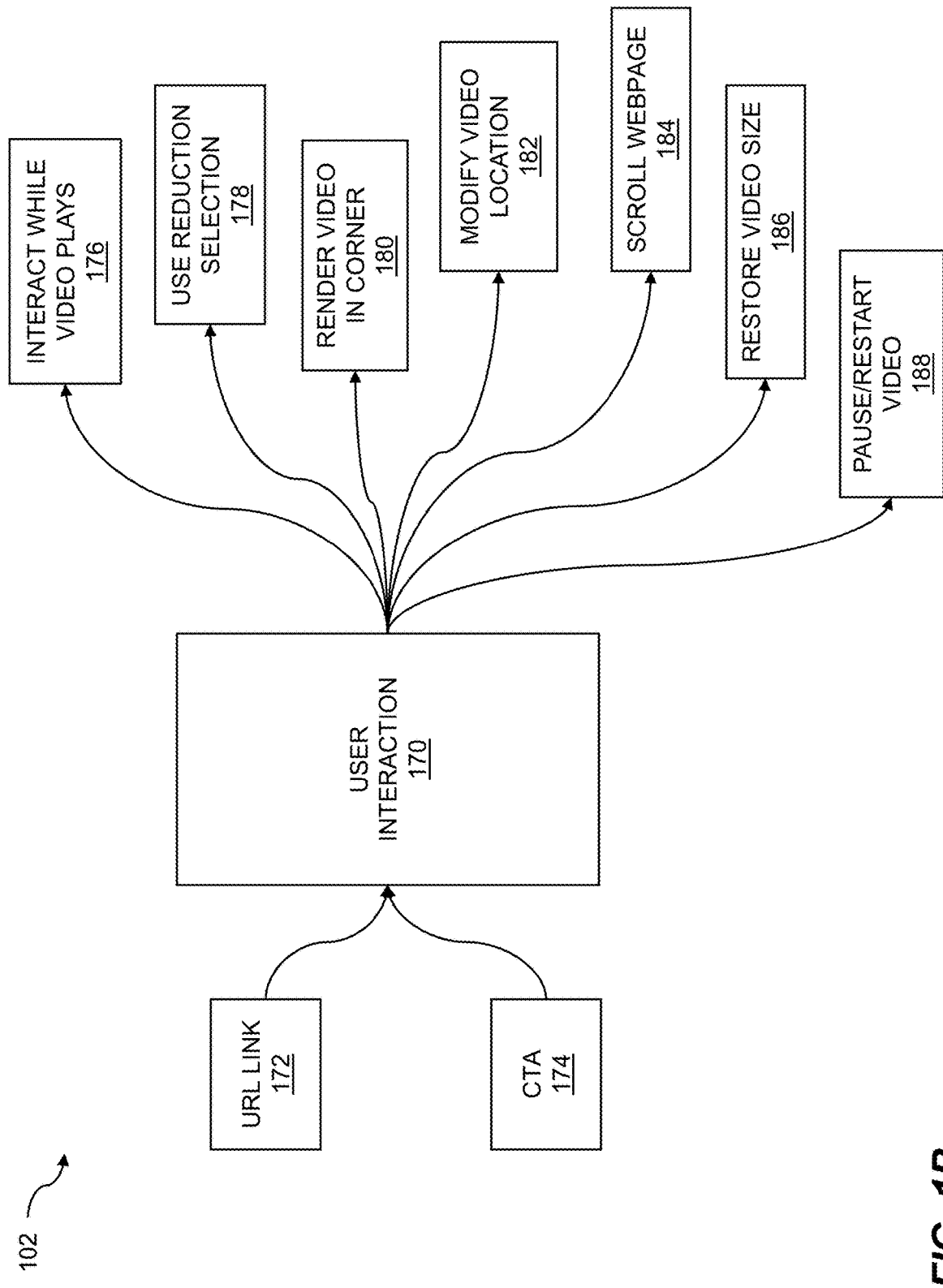
FIG. 1B illustrates frame and child frame user interaction.

FIG. 1B illustrates frame and child frame user interaction. The frame and child frame enable video and webpage rendering. A video stream is received. The video stream is displayed as a video in a window on a device display along with a link. A selection of the link by a user is received. The video is rendered along with results of the link that was selected. The video is reduced to render the video as a reduced video on a portion of the device display. The user interaction with the link, the frame, and the child frame enable various manipulations by the user.

In the example illustration 102, diverse user interactions 170 enable frame and child frame video and webpage rendering. As previously described, a selection of link that was displayed is received by the user. Various kinds of links can be used, such as uniform resource locator (URL) link 172. The URL link 172 can point to an Internet webpage, and intranet webpage, a cloud server file, a local server file, and so on. The link, including a URL link, can comprise a call to action (CTA) 174. The CTA 174, which can also be known as a "click to action", enables various user interactions, including, but not limited to, initiating a web-based transaction. Various other user interactions are included in illustration 102, such as user interaction while the video plays 176, display reduction of the selection 178, display rendering of the reduced video in a corner of the display 180, modifying the location of the reduced video within the display 182, scrolling the webpage 184 while the reduced video stays in a fixed position of the display, restoring the video to its original size 186, and pausing and/or restarting the video 188, to name just a few user interactions within the frame and child frame video and webpage rendering.

Figure 2:
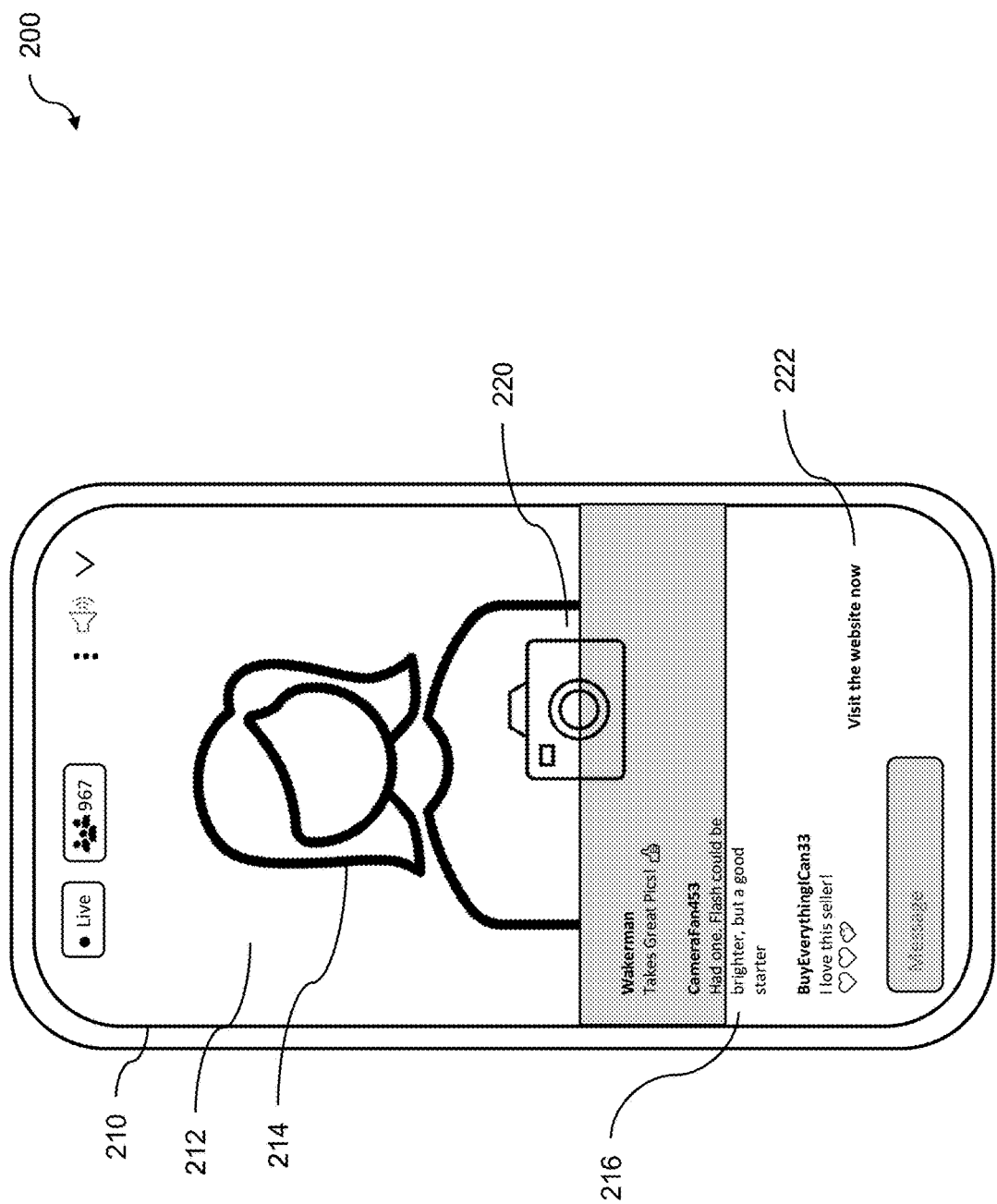
FIG. 2 is an example that illustrates a video window with a link.

FIG. 2 is an example that illustrates a video window with a link. A video such as a video stream video can be rendered within a frame associated with a window such as a video window. The video window can be associated with an application or app, the browser window can be associated with a web browser, and so on. A user can open an app, a window, or a browser tab within web browser on an electronic device to view the video. The web browser can include a popular web browsing application or app, such as Edge™, Safari™, Chrome™ Firefox™, Opera™, Lycos™, and so on. The electronic device can include a computer, a smartphone, a tablet, a PDA, a set-top box, a game console, and the like. The user can click a link associated with the video stream to receive results of the link. The results of the link can include a file, a website, and so on. The results of the link such as a website can be rendered within a child frame within the app or the browser window. The child frame can display content that can be presented and accessed independently of the frame that includes the video. The window that contains the video and the results of the link can also be called a container. The frame and child frame enable video and webpage rendering. A video stream is received. The video stream is displayed as a video in a window on a device display along with a link. A selection of the link by a user is received. The video is rendered along with results of the link that was selected. The video is reduced to render the video as a reduced video on a portion of the device display.

An example video window with a link is shown 200. The video window 210 can include a window associated with an app, a web browser window or tab, and so on. The window can be used to render the video 212 such as a video stream video. A video stream video can include video from an individual 214 such as a celebrity, an influencer, a tastemaker, an individual who loves to stream videos, and so on. In embodiments, the video window can include chat 216. The chat can include chat text, emoji, GIFs, one or more links to content, etc., provided by subscribers, followers, fans, coworkers, and others who are interested in the video stream video. In embodiments, the individual who is streaming the video can present a product 220, a service, a recommendation, an endorsement, etc. In another embodiment, the video window can include a link 222. The link can be associated with the individual 214 within the video, the product 220, and so on. The link can include a link provided by the video stream provider, a link within the chat, a link embedded within the video stream, and the like. A viewer of the video can select the link if they so choose. Choosing the link can provide content such as a file, a webpage, etc., as described throughout.

Figure 3:
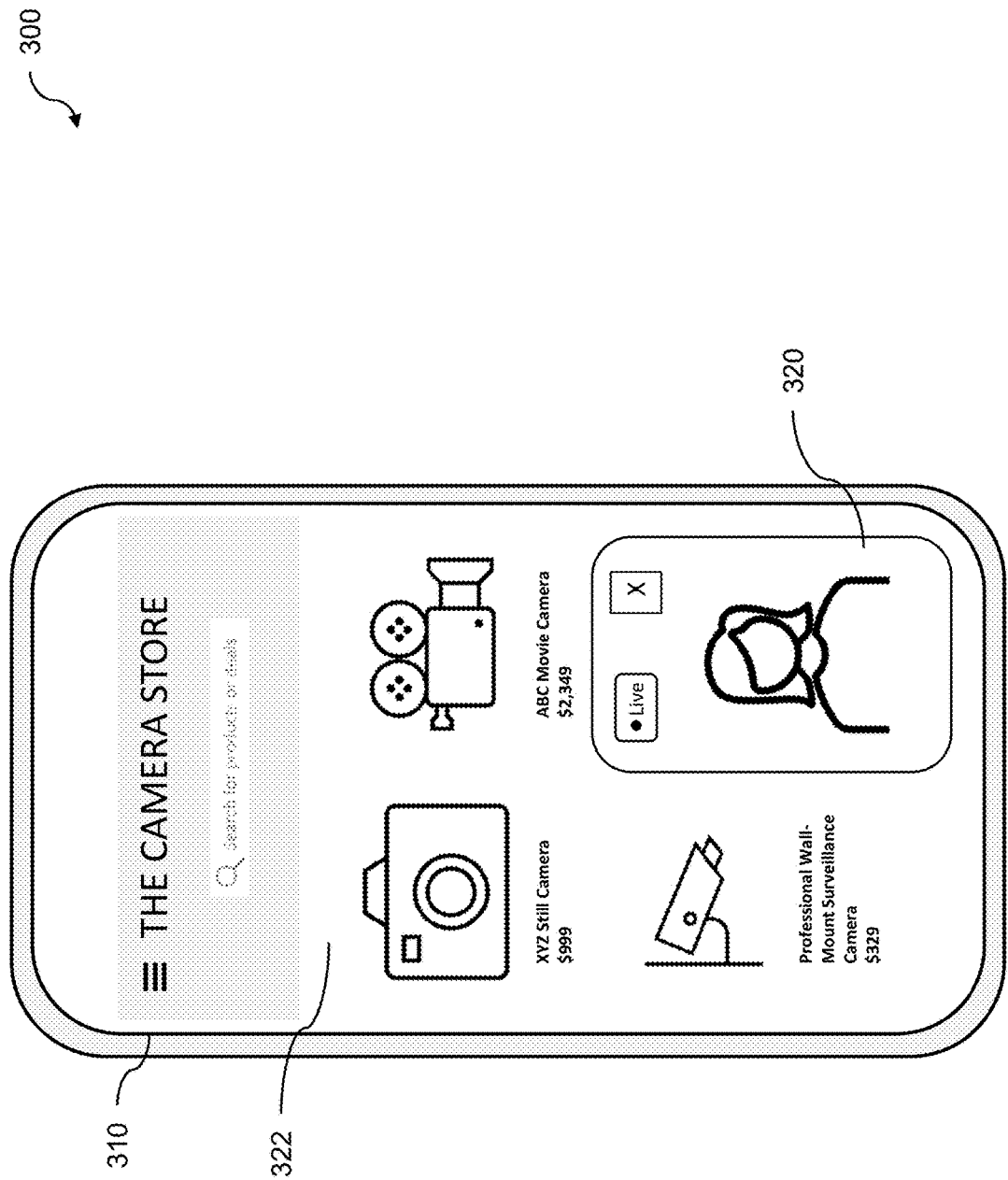
FIG. 3 is an example that shows a reduced video in a child frame, along with link results.

FIG. 3 is an example that shows a reduced video along with link results in a child frame. A user can experience a video stream by viewing the stream on an electronic device such as a computer or personal electronic device. The video stream can be viewed using an app, a window associated with a web browser, and so on. The individual who is experiencing a video stream video can click a link associated with the video stream. The video can be rendered, along with the results of the selected link. The video can be reduced to render the reduced video in a frame on a portion of the device display. The results of the link can be rendered within a child frame on the device display. The results of the link can include a webpage. Video and webpage rendering are enabled using a frame and a child frame.

An example of a reduced video and link results is shown 300. The reduced video and the link results can be rendered on a display 310, where the rendering can be accomplished using an app, a browser window, and so on. The video stream video can be reduced so that the video can be rendered in a portion of the app or browser window along with results of the selected link. The video 320 can be rendered within a frame. The frame can enable viewing of the video stream video; pausing, playing, and stopping the video; and the like. In embodiments, the reducing the video to render the video in a portion of the app or browser window can include launching a third-party webpage 322 to render the video superimposed over the third-party webpage. The webpage can be rendered in a child frame. The reduced window can be rendered at various locations within the app or browser window. In embodiments, the reducing can cause the video to render in a lower right corner of the app or browser window. The location of the reduced video can be fixed, predefined, user defined, and so on. Embodiments can include modifying location for the rendering. The modifying can include clicking on a grid, choosing a menu option, and the like. In embodiments, the modifying location can be in response to a mouse or trackpad dragging motion by the user.

Figure 4:
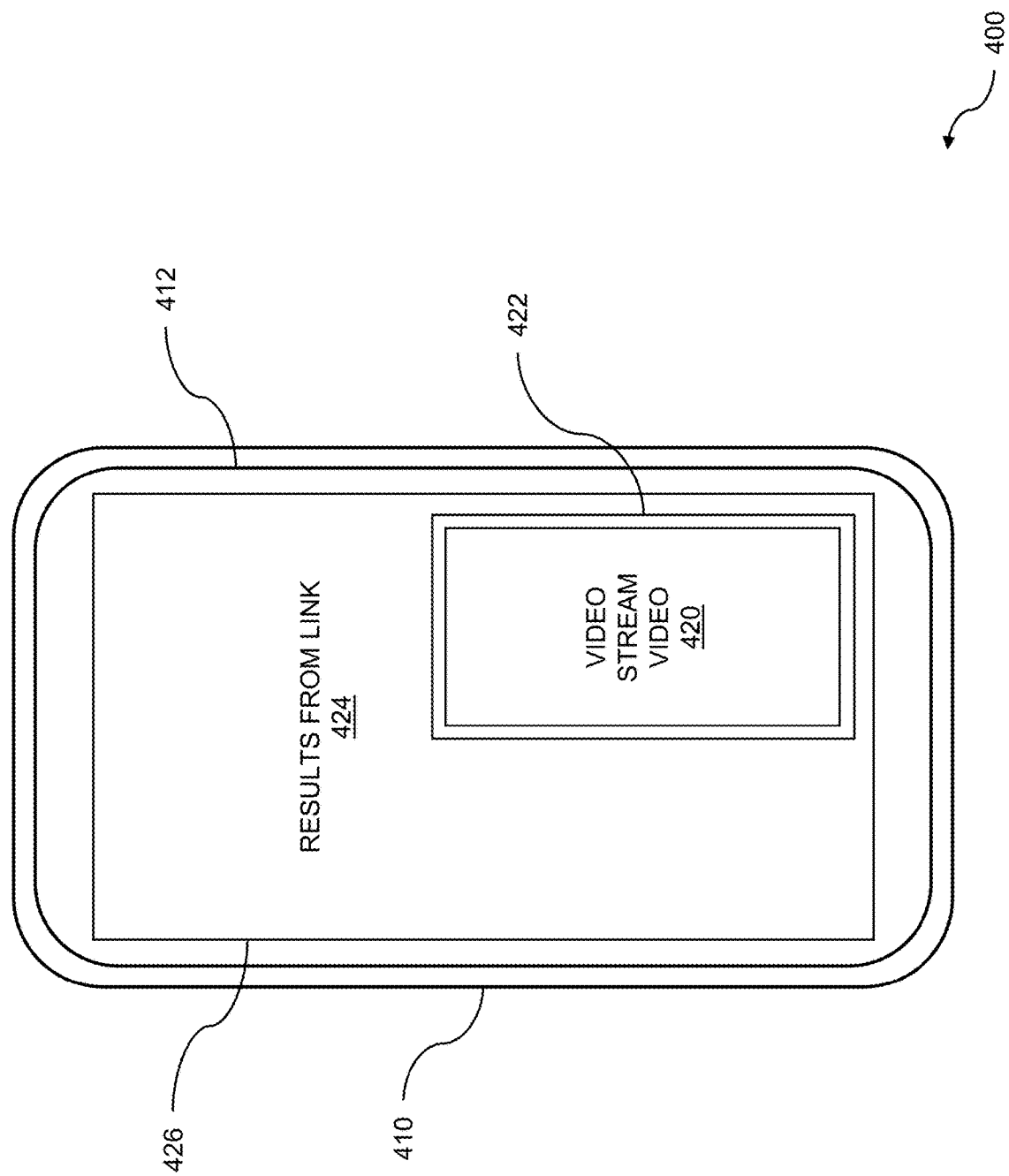
FIG. 4 shows a representation of a video stream and results of a selected link.

FIG. 4 shows a representation of a video stream and results of a selected link. Video stream video and results of a link selected by an individual can be rendered within a frame and one or more child frames. The frame and a child frame can be used for video and webpage rendering. A video stream is received. The video stream is displayed as a video in a window on a device display, along with a link. A selection of the link by a user is received. The video is rendered, along with results of the link that was selected. The video is reduced to render the video as a reduced video on a portion of the device display. An example video stream video and results of a selected link are shown 400. The video, and the results of the selected link, which can include a webpage, can be rendered within an application or app, a window associated with a web browser, and the like. An app or a web browser can be executed on an electronic device 410. The rendering can be accomplished on a display 412 associated with the electronic device. The electronic device can include a computer, a laptop computer, a smartphone, a tablet, a PDA, and so on. The rendering of a video stream video 420 can be accomplished using a frame 422. The frame can occupy a portion of the display. The frame can include a frame within an app, a frame within a browser window, etc. In embodiments, the rendering the reduced video and webpage is accomplished without a popup window. The results of the selected link 424 can be rendered within a child frame 426. In a usage example, the results of the selected link can include a webpage. Embodiments include launching a child frame into which the webpage is displayed. The child frame can be larger than the parent frame 422. In embodiments, the child frame surrounds the video being rendered.

The location of the reduced video 420 within the frame 422 can include a corner, the center, and so on. The results from the link, such as a third-party webpage, can be scrolled to enable viewing of content of the third-party webpage. In embodiments, the reducing the video to render the video, in a portion of the window along with the third-party webpage, can result in the video being rendered such that it remains fixed in the browser window while the third-party webpage is scrolled. The reduced video can play while the third-party website is scrolled. Content presented on the third-party website can be selected for viewing, watching, listening, reading, and so on. In embodiments, the rendering the video can accomplish a picture-within-picture function. The reduced video can be accompanied with one or more options to select further content. The further content can include videos, images, text, audio files, and so on. The further content can comprise a webpage. The further content can be rendered. In embodiments, the rendering the video can accomplish a page-within-page function.

Figure 5:
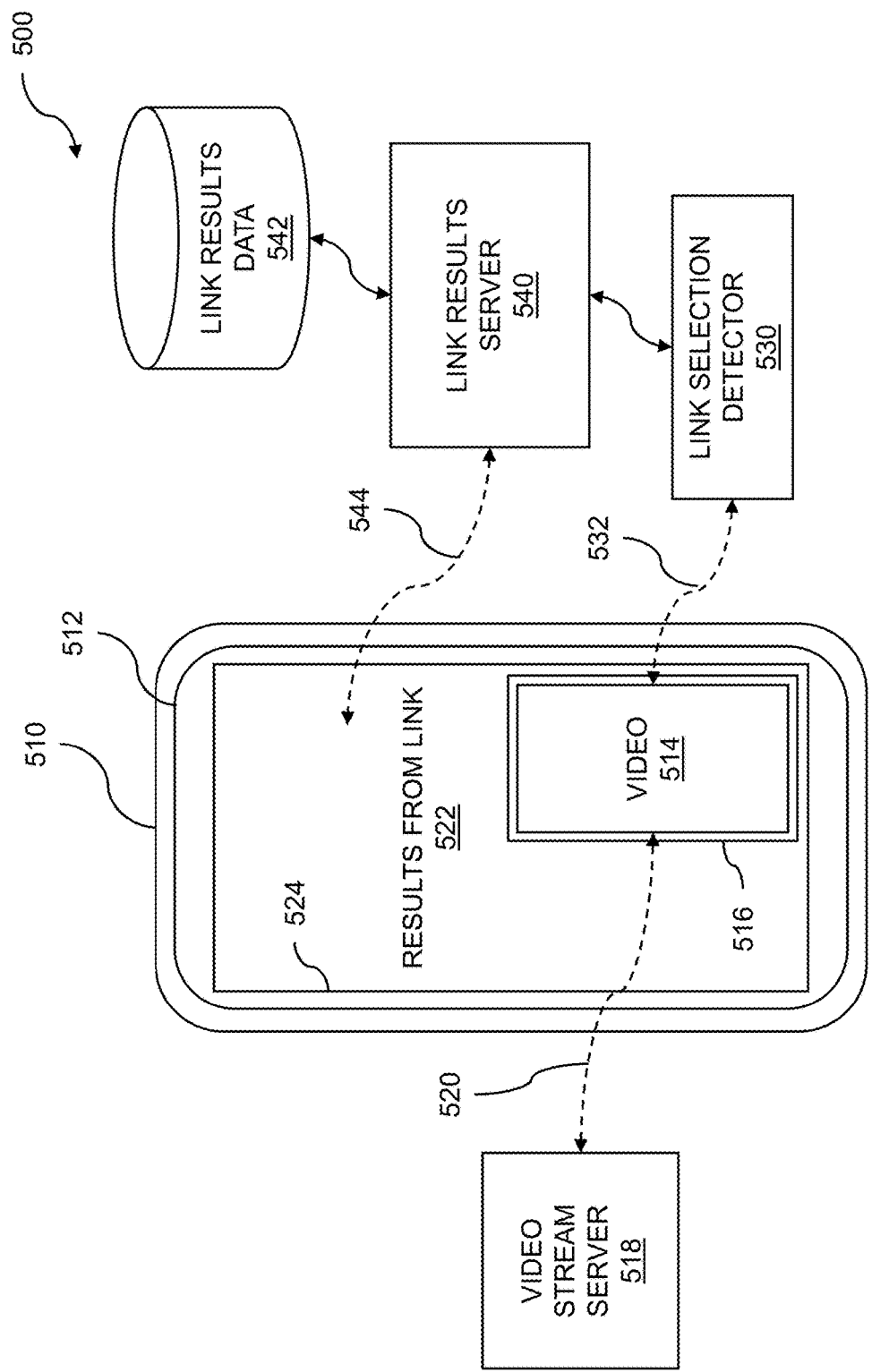
FIG. 5 is a system block diagram for video and webpage rendering.

FIG. 5 is a system block diagram 500 for video and webpage rendering. A video such as a video stream, and results from of a link such as a link to a webpage, can be rendered on a display associated with a computer, a personal electronic device, and so on. The rendering can be based on the use of a frame and one or more child frames for displaying the video and the results of the link. Video and webpage rendering is enabled by the frame and the child frame. A video stream is received. The video stream is displayed as a video in a window on a device display along with a link. A selection of the link by a user is received. The video along with results of the link that was selected are rendered. The video is reduced to render the video as a reduced video on a portion of the device display.

Described throughout, videos associated with video streams can be viewed by a user who is interested in the contents of the stream, curious about the stream, an avid follower of an individual associated with the stream, and so on. The stream associated with the video stream can be received from a server or a social media site, can be provided by an individual, etc. An individual viewing the video associated with the video stream can make a selection of a link to content that can be of interest to the individual. The selection of the link can be indicated by clicking on a link presented along with the video stream, a link shared by another viewer in a chat stream, a link embedded in the video stream, and the like. The link can point to a webpage, a file such as a text, a PDF, an audio or image file, an application or app, etc. A webpage pointed to by a link can include one of a plurality of webpages that can be viewed by the user. A webpage can be rendered along with a reduced version of the video. The user can interact with the webpage while the video stream continues to play. Embodiments include interacting with a webpage, by the user, based on the selection of the link, while the video is being rendered. The rendering of a webpage and the reduced video can be viewed on an electronic device 510. The electronic device can include a desktop or laptop computer, a tablet or smartphone, a personal digital assistant (PDA), and so on. The electronic device is coupled to a display 512 on which a video such as a reduced video associated with a video stream 514 can be rendered. The video stream can be rendered within a frame 516. The frame can be used to display content such as the video stream independent of the app, browser window, etc. that can contain the frame.

The video stream can be received from a video stream server 518. The video stream server can include a web-based or cloud-based server, a local server, an electronic device associated with the provider of the video stream, etc. The video stream server can provide the video stream using a communication channel 520. The communication channel can include a wired channel, a wireless channel, and the like. Described below, an individual, or user, can click a link associated with the video stream. Results 522 from the link can be rendered within a frame 524, where the frame 524 can include a child frame. Embodiments include launching a child frame into which a webpage or other content is displayed. Note that in the system block diagram 500, the frame within which the results from the link can be rendered surrounds the reduced video that is being rendered. In embodiments, the rendering the reduced video can accomplish a picture-within-picture function. The results from a link, rendered within the child frame 524, can include a video. In other embodiments, the rendering can be accomplished using an inline frame function within an internet browser application. The individual can view the video while she or he interacts with the content within the child frame. The interacting can include swiping, scrolling; clicking links, radio buttons, and menu selections; etc.

The system block diagram 500 can include a link selection detector 530. The link selection detector can detect that an individual has selected a link, where the link can include a link provided by the provider or originator of the video stream, a link provided in a chat associated with the video stream, a link embedded within the video stream etc. The link can be selected by clicking on the link, swiping, selecting a link from a menu, etc. The link selection can be received by the link selection detector using a communication channel such as a wireless communication channel 532.

The link selection detector in effect hijacks the link selection and provides the link to a link results server 540, which can be a different server from the server originally accessed by the user. The link results server can provide access to link results by accessing a webpage; opening a file such as a text, PDF, or image file; beginning playback of an audio or video file; connecting to a video stream; and the like. The link results server may access link results data 542 such as the files mentioned previously. The link results server can provide the link results to the child frame 524 using a communication channel. In embodiments, the communication channel can include a wireless 544 communication channel.

Figure 6:
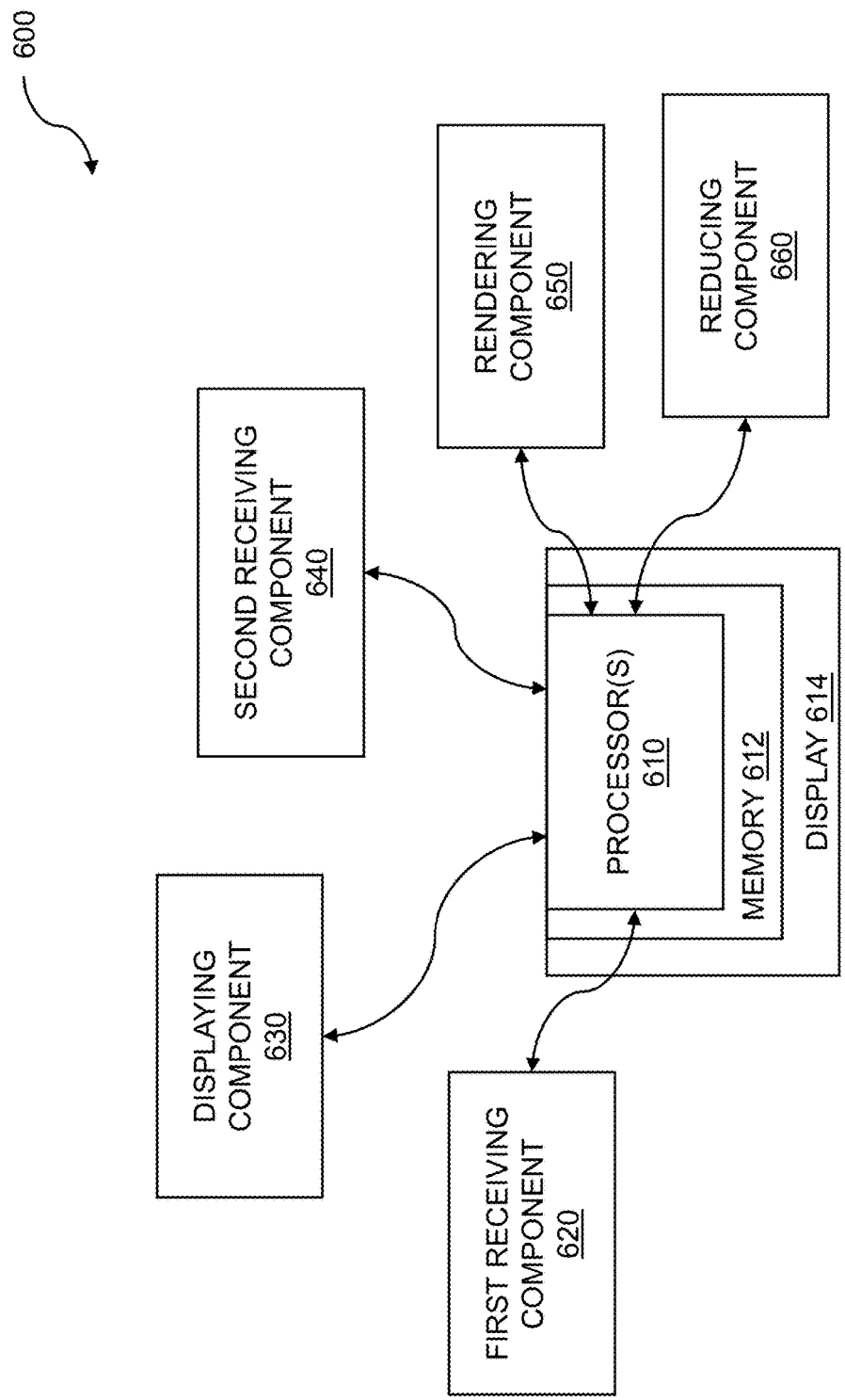
FIG. 6 is a system diagram for display.

FIG. 6 is a system diagram for display. Display is based on a frame and child frame for video and webpage rendering. The system 600 can include one or more processors 610 coupled to a memory 612 which stores instructions. The system 600 can include a display 614 coupled to the one or more processors 610 for displaying data, video streams, videos, webpages, intermediate steps, instructions, and so on. In embodiments, one or more processors 610 are coupled to the memory 612 where the one or more processors, when executing the instructions which are stored, are configured to: receive a video stream; display the video stream as a video in a window on a device display along with a link; receive a selection of the link by a user; launch a child frame from the window; render the video along with results of the link that was selected; and reduce the video to render the video as a reduced video on a portion of the device display.

The system 600 can include a first receiving component 620. The first receiving component 620 can include functions and instructions for receiving a video stream. A video stream can include a live video stream, where the originator of the video stream can include a tastemaker, an influencer, an artist, a musician, a DJ, an individual with content she or he wants to share, a provider of a good or service, and so on. The video stream can include content such as news, sports, advertisements, political events, culture, popular news such as celebrity updates, real-time cute puppy and kitten videos, nature news, and so on. The video stream can include a curated stream; videos from a streaming website, a video server, social media or other shared sites; and the like. The videos can be viewed using an app, a web browser, etc. The system 600 can include a displaying component 630. The displaying component 630 can include functions and instructions for displaying the video stream as a video in a window on a device display along with a link. The displaying can be accomplished with an app, a window such as a web browser window, a web browser add-on, and so on. The link can include a link displayed with the video, a link provided by the provider of the video, a URL included in a comment from a viewer of the video, a link accessible by clicking within the video, etc.

The system 600 can include a second receiving component 640. The second receiving component 640 can include functions and instructions for receiving a selection of the link by a user. The user can select the link by clicking on a link, selecting a link from a menu, mousing over the video, and so on. In embodiments, the link can include a webpage uniform resource locator (URL). The selecting the link by the user can use the URL to access a webpage, open a file such as a text or image file, start a video, open a GIF, etc. In embodiments, the selection by the user is in response to a call to action. A call to action can include a "Click here now!" request, a response to a question posed by a person providing the livestream, a response to a survey, etc. The accessing a webpage, opening a file, etc., produces one or more results of the link. The results of the link can be provided to the receiving component. The system 600 can include a rendering component 650. The rendering component 650 can include functions and instructions for rendering the video along with results of the link that was selected. The rendering can be accomplished using an app, a window associated with a web browser, and so on. In embodiments, rendering of the results of the link can include a webpage associated with the webpage URL. The rendering can include displaying the video and the results of the link on a device display. The device can include a computing device such as a server, desktop computer, or laptop computer; a personal electronic device such as a smartphone, tablet, or PDA; and so on. The display can include a display associated with the computing device or personal electronic device, a television screen, a projector, etc.

The system 600 can include a reducing component 660. The reducing component 660 can include functions and instructions for reducing the video to render the video as a reduced video on a portion of the device display. The rendering can include displaying the reduced video in a portion of a window associated with an app, a browser window, etc., along with the results of the link. In embodiments, the reduced video can be rendered over the results of the link that was selected. The reduced video can block or mask the portion containing the outer webpage. In embodiments, the rendering can be accomplished using an inline frame function within an internet browser application. In embodiments, the reducing the video can be accomplished in response to a reduction selection by the user. The reduction selection can include clicking or double clicking the video, clicking a button such as a radio button, clicking a menu selection, and the like. Recall that the link can enable access to a webpage, open a text or image file, play a video, and the like. In embodiments, the rendering the reduced video and webpage can be accomplished without a popup window. The rendering the results of the link can be accomplished without user action or intervention. In embodiments, the webpage can be launched within an expanded container window containing display of both the webpage and the video that was reduced. In embodiments, the reducing can cause the video to render in a lower right corner of the display. Other locations within the display can be modified. In embodiments, the modifying location can be implemented in response to a mouse dragging motion by the user. The reducing of the video can be accomplished by clicking on the video, moving a cursor away from the video, and the like. In embodiments, the reducing the video is accomplished in response to a reduction selection by the user. The user selection can include a button click, a menu selection, and so on. Further embodiments can include interacting with the webpage, by the user, while the video is being rendered. The video can continue to stream, play, etc. In embodiments, the video can be paused and restarted based on selection by the user.

The user can interact with the results of the link. The interacting can include clicking, swiping, zooming, making menu selections, etc. In other embodiments, the reducing the video to render the video, in a portion of the window along with the results of the link, can result in the video being rendered such that it remains fixed in the browser window while the results of the link are scrolled. The video can continue to play while the webpage is scrolled, read, viewed, etc. Further embodiments can include scrolling the webpage while location of the video remains fixed. A user can continue to view, interact with, etc., the results of the link that are rendered with the video, can "close" or discard the results of the link, and the like. In embodiments, the rendering the reduced video accomplishes a picture-within-picture function. The smaller picture can include the video and the larger "picture" can include a video, a webpage, a file, etc. In embodiments, the webpage can be an outer picture for the picture-within-picture function. Further, the rendering the video can be displayed as an inner picture for the picture-within-picture function. Other configurations can be used. In embodiments, the rendering the reduced video can accomplish a page-within-page function. Embodiments can include maximizing the video, after the reducing, to restore rendering of the video in the browser window, along with the third-party webpage, to an original size of the video. The child frame can be closed.

The system 600 can include a computer program product embodied in a non-transitory computer readable medium for display, the computer program product comprising code which causes one or more processors to perform operations of: receiving a video stream; displaying the video stream as a video in a window on a device display along with a link; receiving a selection of the link by a user; launching a child frame from the window; rendering the video along with results of the link that was selected; and reducing the video to render the video as a reduced video on a portion of the device display.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for display comprising:
   receiving a video stream;
   displaying the video stream as a video in a window on a device display along with a link that is embedded within the video stream;
   receiving by a link selection detector, a selection of the link by a user;
   providing, by the link selection detector, the selected link to a link results server;
   obtaining results of the link that was selected from the link results server;
   launching a child frame from the window;
   rendering the video along with the results of the link that was selected, wherein the results of the link include a third-party webpage, and wherein the results of the link are displayed and wherein the child frame surrounds the video being rendered;
   manipulating, by the user, the results of the link, wherein the manipulating comprises starting and pausing rendering of the results, wherein the manipulating further comprises scrubbing the results to enable fast forward and fast reverse playback control;
   reducing the video to render the video as a reduced video on a portion of the device display, wherein the reducing includes reducing the video based on a percentage, an aspect ratio, and a user selection, and wherein the reduced video is rendered over the results of the link that was selected;
   modifying a location for the reduced video being displayed in response to a finger slide on a touch sensitive display; and
   scrolling the webpage while location of the video remains fixed and the video continues to play.

2. The method of claim 1 further comprising interacting with a webpage, by the user, based on the selection of the link, while the video is being rendered.

3. The method of claim 1 wherein the selection by the user is in response to a call to action, wherein the call to action includes a support link.

4. The method of claim 1 wherein the video stream includes a livestream.

5. The method of claim 1 wherein the reducing the video is in response to a reduction selection by the user.

6. The method of claim 1 wherein the reducing causes the video to render in a lower right corner of the window.

7. The method of claim 1 wherein the link includes a webpage uniform resource locator (URL).

8. The method of claim 7 wherein rendering of the results of the link includes a webpage associated with the webpage URL.

9. The method of claim 8 wherein the rendering the reduced video and webpage is accomplished without a popup window.

10. The method of claim 1 further comprising maximizing the video, after the reducing, to restore rendering of the video to an original size of the video.

11. The method of claim 1 wherein the rendering the reduced video accomplishes a picture-within-picture function.

12. The method of claim 11 wherein a webpage is an outer picture for the picture-within-picture function.

13. The method of claim 12 wherein the rendering the video is an inner picture for the picture-within-picture function.

14. The method of claim 13 wherein the webpage includes another video being displayed along with the reduced video.

15. The method of claim 1 wherein the rendering the reduced video accomplishes a page-within-page function.

16. The method of claim 1 wherein the rendering is accomplished using an inline frame function within an internet browser application.

17. The method of claim 1 wherein the webpage is launched within an expanded container window containing display of both the webpage and the video that was reduced, and wherein the results from the link surround the reduced video that is being rendered.

18. The method of claim 1 wherein the reduced video is rendered over the results of the link that was selected.

19. The method of claim 1 wherein the video is paused and restarted based on selection by the user.

20. The method of claim 1 wherein the manipulating comprises scrolling the results.

21. The method of claim 1, wherein the reduced video is accompanied by one or more options to select further content.

22. The method of claim 21, wherein the further content includes another video.

23. The method of claim 1 wherein the link is provided by an originator of the video stream, and wherein the link results server provides link results to the child frame via a wireless communication channel.

24. A computer program product embodied in a non-transitory computer readable medium for display, the computer program product comprising code which causes one or more processors to perform operations of:
   receiving a video stream;
   displaying the video stream as a video in a window on a device display along with a link that is embedded within the video stream;
   receiving by a link selection detector, a selection of the link by a user;
   providing, by the link selection detector, the selected link to a link results server;
   obtaining results of the link that was selected from the link results server;
   launching a child frame from the window;
   rendering the video along with the results of the link that was selected, wherein the results of the link include a third-party webpage, and wherein the results of the link are displayed and wherein the child frame surrounds the video being rendered;
   manipulating, by the user, the results of the link, wherein the manipulating comprises starting and pausing rendering of the results, wherein the manipulating further comprises scrubbing the results to enable fast forward and fast reverse playback control;

reducing the video to render the video as a reduced video on a portion of the device display, wherein the reducing includes reducing the video based on a percentage, an aspect ratio, and a user selection, and wherein the reduced video is rendered over the results of the link that was selected;

modifying a location for the reduced video being displayed in response to a finger slide on a touch sensitive display; and scrolling the webpage while location of the video remains fixed and the video continues to play.

25. A computer system for display comprising:

a memory which stores instructions;

one or more processors coupled to the memory wherein the one or more processors, when executing the instructions which are stored, are configured to:

receive a video stream;

display the video stream as a video in a window on a device display along with a link that is embedded within the video stream;

receive by a link selection detector, a selection of the link by a user;

provide, by the link selection detector, the selected link to a link results server;

obtain results of the link that was selected from the link results server;

launch a child frame from the window;

render the video along with the results of the link that was selected, wherein the results of the link include a third-party webpage, and wherein the results of the link are displayed and wherein the child frame surrounds the video being rendered;

manipulate, by the user, the results of the link, wherein manipulating comprises starting and pausing rendering of the results, wherein manipulating further comprises scrubbing the results to enable fast forward and fast reverse playback control;

reduce the video to render the video as a reduced video on a portion of the device display, wherein reducing includes reducing the video based on a percentage, an aspect ratio, and a user selection, and wherein the reduced video is rendered over the results of the link that was selected;

modify a location for the reduced video being displayed in response to a finger slide on a touch sensitive display; and scroll the webpage while location of the video remains fixed and the video continues to play.

\* \* \* \* \*